United States Patent [19]
Rosa et al.

[11] 3,835,707
[45] Sept. 17, 1974

[54] DEVICE FOR SURVEYING THE CONFIGURATION OF AN IMMERSED PIPE DURING ITS LAYING

[75] Inventors: Giovanni Rosa; Angelo Canepa, both of San Donato Milanese, Italy

[73] Assignee: SAIPEM, S.p.A., San Donato Milanese, Italy

[22] Filed: Nov. 10, 1972

[21] Appl. No.: 305,470

[30] Foreign Application Priority Data
Nov. 17, 1971 Italy................................. 31193/71

[52] U.S. Cl..................... 73/291, 33/1 H, 61/72.3, 73/300, 73/432 R, 73/432 HA
[51] Int. Cl............................................. G01c 19/76
[58] Field of Search..... 73/432 HA, 40.5 R, 40.5 A; 33/1 H, 1 E, 1 C, 1 LE, 370, 371, 373, 374, ; 61/72.3

[56] References Cited
UNITED STATES PATENTS

| | | | |
|---|---|---|---|
| 2,709,920 | 6/1955 | Moore............................ | 73/432 HA |
| 2,884,624 | 4/1959 | Dean et al. ...................... | 73/40.5 A |
| 3,036,457 | 5/1962 | Wood et al. ......................... | 73/40.5 |
| 3,487,648 | 1/1970 | Lawrence ............................ | 61/72.3 |
| 3,571,937 | 3/1971 | Sears..................................... | 33/1 H |

*Primary Examiner*—S. Clement Swisher
*Attorney, Agent, or Firm*—Ralph M. Watson, Esq.

[57] ABSTRACT

An apparatus for surveying the configuration of a submarine pipeline during its laying including a carriage carrying depth sensing and distance sensing means and adapted to be rolled along the pipe between the pipe laying ship and the bottom of the body of water. Depth and distance are simultaneously recorded.

2 Claims, 2 Drawing Figures

PATENTED SEP 17 1974  3,835,707

DEVICE FOR SURVEYING THE CONFIGURATION OF AN IMMERSED PIPE DURING ITS LAYING

As it is known, the increase in utilization of the petroliferous fields has caused a boom of the technology for the pipe laying. Since the depths to be reached are higher and higher there is now the necessity to survey, during the laying of the pipes, the configuration (known as "deformata" in italian) taken by said pipes in order to compare said configuration with the theoretic ones and to have in such a way the possibility of drawing from said comparison a valuation of the stress state of the used materials.

An object of the device according to the invention is just the survey of the "deformata" of the pipe. On the other hand the invention relates also to a surveying process of the "deformata," said process being constituted by the set of operations fulfilled by the device to be described hereinafter.

Prior art mentions no device similar to the one of the invention. The device according to the invention is of easy realization, low cost and easy use and comprises the suitable combination of elements consisting of:

a. a wheel structure surrounding the pipe and sliding along said pipe owing to its own weight with a descent speed adjusted by a winch;

b. one or several instruments measuring the pipe depths both as pressure values, e.g., spring gauges of the Bourdon type, and the like and/or the inclination of the same pipe, e.g., gyroscopes, said instruments being fixed to structure a);

c. a friction wheel connected to a synchronous motor connected at its turn to the feed motor of an apparatus recording the distance covered by the same structure, said friction wheel being fixed to said structure too;

d. a recorder, preferably a tape recorder having a paper feed proportional to the carriage motion and the writing part connected to the instruments measuring the pipe depth or inclination [see point b)];

e. a draft winch for recovering the device and adjusting the descent speed of the structure carrying the instruments;

f. a system for transmitting the measurement [see point b)] to the recorder [see point d)], said system being of electric or pneumatic type or the like;

g. a system for automatically stopping the draft winch when the device according to the invention is near the sea-bottom.

Summing up, the device according to the invention allows the determination of the pipe "deformata" in a very easy way. After structure a) has been arranged around the pipe to be immersed, said structure runs along said pipe by means of rotating members (wheels). The recording of the sliding of a friction wheel c) allows the survey of the structure position as to the pipe. The sliding of the structure is adjusted by a suitable winch. As before said, the structure is provided with instruments able to survey the pipe depth or inclination while the corresponding values are spent to a conventional recording system. By means of such a system the survey of the pipe depth or inclination is practically made in a stepless way along the whole length of the pipe.

The same single components of the device are of easy construction and assembling and they are well-known to any-one skilled in the art.

Figure 1:
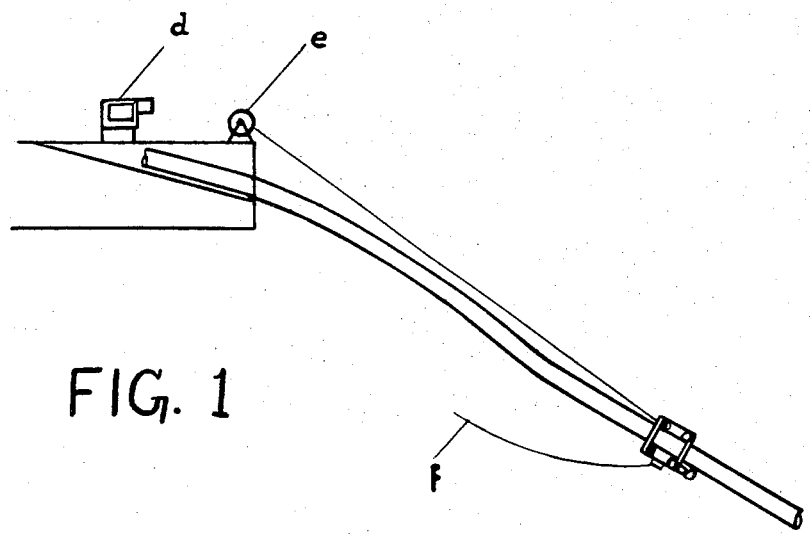
FIG. 1 shows the relationship of the device to the pipe and ship.
Figure 2:
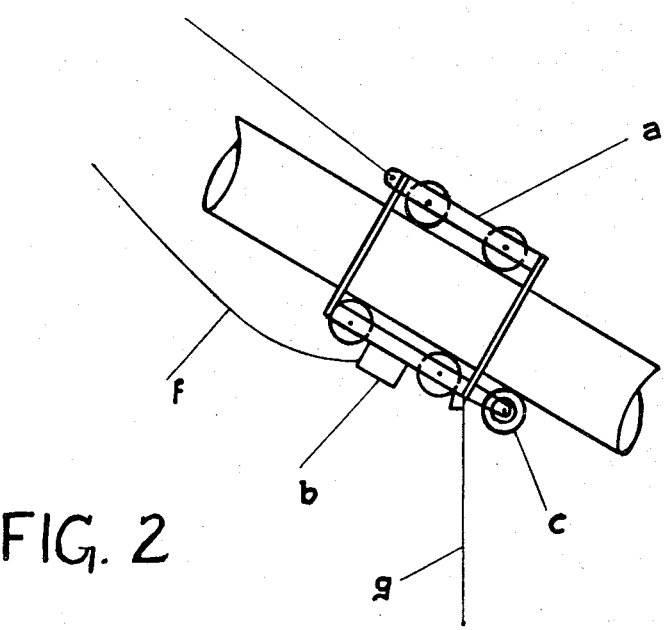
FIG. 2 is a detailed view of the measuring carriage.

The invention will be now explained with reference to the accompanying drawing wherein:

a. represents the structure sliding by means of one or several wheels, four wheels being shown in Figure b. represents the instrumentation for surveying the pipe depth or inclination c. represents the friction wheel connected to a system allowing to determine the distance covered by the structure along the pipe through the survey of the number of revolutions of said friction wheel d. represents a signal recording system e. represents a winch for operating the structure f. represents a cable for transmitting the signals g. represents a system for stopping the structure near the sea-bottom.

What we claimed is:

1. Device for surveying the configuration of a pipe during its laying, comprising:

a structure surrounding the pipe and sliding along said pipe with a controlled speed;

an instrument fixed to said structure for measuring the depth of said pipe;

a friction wheel fixed to said structure and in frictional engagement with said pipe, signal means connected to said friction wheel for transmitting a signal proportional to the distance traveled by said friction wheel along said pipe;

means for recording the depth measured by said instrument and the signals transmitted by said friction wheel;

means for transmitting the depth measurement from said instrument and the signals from said friction wheel to said recording means; means for automatically stopping said structure; and, means for recovering said structure and for adjusting the sliding speed of said structure along said pipe.

2. Device according to claim 1, wherein the means for recovering said structure and for adjusting the sliding speed is a winch and cable connected to said structure.

* * * * *